(12) United States Patent
Agarwal et al.

(10) Patent No.: US 11,560,183 B2
(45) Date of Patent: Jan. 24, 2023

(54) TRUCK BEDSLIDE ASSEMBLY

(71) Applicant: Truck Accessories Group, LLC, Elkhart, IN (US)

(72) Inventors: Sandeep Agarwal, Troy, MI (US); Jacob Rasmussen, Troy, MI (US); Gopinath Siva, Troy, MI (US); Sharath Kumar Srinivasa, Troy, MI (US)

(73) Assignee: Leer Group, Elkhart, IN (US)

( * ) Notice: Subject to any disclaimer, the term of this patent is extended or adjusted under 35 U.S.C. 154(b) by 176 days.

(21) Appl. No.: 17/083,889

(22) Filed: Oct. 29, 2020

(65) Prior Publication Data
US 2021/0129922 A1    May 6, 2021

Related U.S. Application Data

(60) Provisional application No. 62/929,387, filed on Nov. 1, 2019.

(51) Int. Cl.
*B62D 33/00* (2006.01)
*B62D 33/08* (2006.01)
*B62D 33/02* (2006.01)

(52) U.S. Cl.
CPC ............. *B62D 33/08* (2013.01); *B62D 33/02* (2013.01)

(58) Field of Classification Search
CPC .......... B60P 1/003; B60P 1/433; B62D 33/02; B62D 33/0207; B62D 33/08; B62D 33/027; B60R 9/06; B60R 5/041
USPC ........................................... 296/26.08, 26.09
See application file for complete search history.

(56) References Cited

U.S. PATENT DOCUMENTS

| | | | |
|---|---|---|---|
| 3,132,755 A | * | 5/1964 | Greenslate ................ B60R 5/04 414/522 |
| 4,950,123 A | | 8/1990 | Brockhaus |
| 6,659,524 B1 | | 12/2003 | Carlson |
| 6,883,849 B2 | | 4/2005 | Hebert |

(Continued)

FOREIGN PATENT DOCUMENTS

| | | |
|---|---|---|
| CA | 2392444 C | 5/2009 |
| CA | 2859812 C | 10/2016 |
| CA | 2755082 C | 11/2016 |

OTHER PUBLICATIONS

Notification of Decision Concerning Request for Rectification; PCT/US2020/058128; Filing Date Oct. 30, 2020 dated Jan. 28, 2021.

(Continued)

*Primary Examiner* — Stephen T Gordon
(74) *Attorney, Agent, or Firm* — Barnes & Thornburg LLP

(57) ABSTRACT

A bedslide assembly for use on a deck bed of a pickup truck is provided. An illustrative example of the bedslide assembly includes a bottom frame assembly, middle frame assembly, and top frame assembly. The bottom frame assembly includes a first latch bracket and a second latch bracket. The middle frame assembly includes a first latch assembly and a second latch assembly. The first latch assembly includes a hook. The second latch assembly also includes a hook. The top frame assembly includes an end plate. The hook of the first latch assembly is selectively engageable with the first latch bracket of the bottom frame assembly. The hook of the second latch assembly is selectively engageable with the end plate of the top frame assembly.

20 Claims, 15 Drawing Sheets

(56) References Cited

U.S. PATENT DOCUMENTS

| | | | |
|---|---|---|---|
| 7,083,219 B1 | 8/2006 | Gregory | |
| 7,121,603 B2* | 10/2006 | Stevenson | B60P 1/003 |
| | | | 296/26.09 |
| 7,445,263 B1 | 11/2008 | Bluhm | |
| 9,227,547 B2 | 1/2016 | Williams | |
| 9,238,429 B2 | 1/2016 | Bluhm | |
| 9,387,891 B2 | 7/2016 | Richins | |
| 9,610,881 B2 | 4/2017 | Williams | |
| 10,167,025 B2 | 1/2019 | Richins | |
| 2004/0007889 A1 | 1/2004 | Hebert | |
| 2007/0210599 A1* | 9/2007 | Arnold | B60P 1/003 |
| | | | 296/26.09 |
| 2013/0001974 A1* | 1/2013 | Alexander | B60R 5/041 |
| | | | 296/26.09 |
| 2013/0341949 A1 | 12/2013 | Bernthisel | |
| 2016/0090016 A1 | 3/2016 | Williams | |
| 2016/0312482 A1 | 10/2016 | Robinson et al. | |

OTHER PUBLICATIONS

International Search Report; PCT/US2020/058128; Filing Date Oct. 30, 2020; dated Jan. 25, 2021.

* cited by examiner

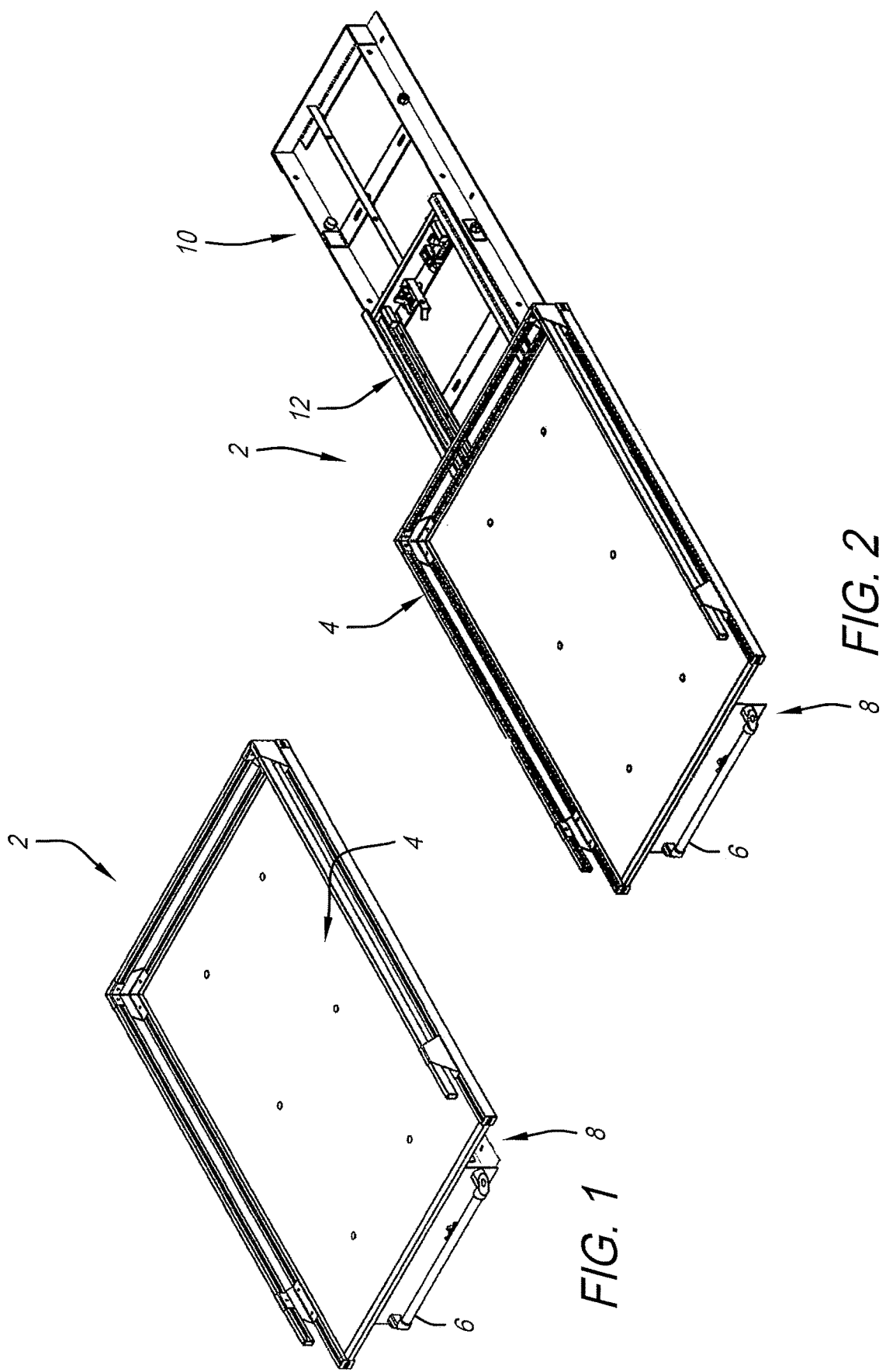

TRUCK BEDSLIDE ASSEMBLY

RELATED APPLICATIONS

The present application relates to and claims priority to U.S. Provisional Patent Application Ser. No. 62/929,387, filed on Nov. 1, 2019. The subject matter disclosed in that provisional application is hereby expressly incorporated into the present Application.

TECHNICAL FIELD AND SUMMARY

The present disclosure relates to trucks such as pickup trucks, and truck beds used on pickup trucks, and like vehicles. In particular, the present disclosure relates to a bedslide assembly affixed to the truck bed, which is extendable from, and retractable to, the truck bed.

A truck bed is a large open cargo space of a pickup truck located behind the cab section. The truck bed is typically composed of a deck floor bounded by opposing sidewalls. A bulkhead wall extends between the opposed sidewalls and is located adjacent the cab section. The tailgate is located opposite the bulkhead wall at the rear end of the truck bed and movable between open and closed positions.

An illustrative embodiment of the present disclosure provides a bedslide assembly for use on a deck bed of a pickup truck. The bedslide assembly comprises a bottom frame assembly, middle frame assembly, and top frame assembly. The bottom frame assembly is configured to be attached to the deck bed. The bottom frame assembly includes spaced apart opposing first and second side bars, at least one roller rotatably attached to each of the first and second side bars, and at least one cross member extending transverse the first and second side bars. The at least one cross member includes a first latch bracket and second latch bracket attached thereon. A stop arm extends transverse to the at least one cross member and includes a plurality of periodically spaced holes.

The middle frame assembly includes opposing spaced apart first and second rail sets. Each of the first and second rail sets includes an upper rail and a lower rail. At least one cross member with a full extension stop bracket attached to the first and second rail sets. The middle frame assembly further incudes a first latch assembly, a second latch assembly, and a stop member. The first latch assembly includes a hook biased toward a downward latching direction with respect to the truck bed. The biased hook includes a paddle both of which are pivotable. The second latch assembly includes a hook biased toward an upward latching direction with respect to the truck bed. The biased hook includes a paddle both of which are pivotable. The stop member is at least partially pivotable with respect to the middle frame assembly.

The top frame assembly includes spaced apart opposing first and second side bars, at least one roller rotatably attached to each of the first and second side bars, at least one cross member extending transverse the first and second side bars, an end plate also extending transverse the first and second side bars, a stop member, and a selective stop mechanism. The stop member of the top frame assembly is at least partially pivotable with respect to the top frame assembly. The selective stop mechanism includes a stop pin that extends transverse with respect to the spaced apart opposing first and second side bars.

At least one roller is rotatably attached to each of the first and second side bars of the top frame assembly. The rollers engage and are movable along one of the upper rails of the opposing spaced apart first and second rail sets of the middle frame assembly. At least one roller is rotatably attached to each of the first and second side bars of the bottom frame assembly as well. The rollers engage and are movable along one of the lower rails of the opposing spaced apart first and second rail sets of the middle frame assembly.

The stop pin of the selective stop mechanism selectively engages any one of the plurality of periodically spaced holes of the stop arm. This limits movement of the top frame assembly and the middle frame assembly with respect to the bottom frame assembly at each of the plurality of periodically spaced holes. The hook of the first latch assembly is selectively engageable with the first latch bracket on the cross member of the bottom frame assembly. When the paddle of the first latch assembly is struck by the end plate of the top frame assembly the hook of the first latch assembly is releasable from the first latch bracket on the cross member of the bottom frame assembly. The hook of the second latch assembly is selectively engageable with the end plate of the top frame assembly, and when the paddle of the second latch assembly is struck by the second latch bracket of the bottom frame assembly the hook of the second latch assembly is releasable from the end plate of the top frame assembly.

In the above and other embodiments, the tonneau cover may further comprise: the stop member of the top frame assembly being engageable with the full extension stop bracket of the middle frame assembly to limit extension of the top frame assembly with respect to the middle frame assembly; the stop member of the middle frame assembly being engageable with the second latch bracket of the bottom frame assembly to limit extension of the middle frame assembly with respect to the bottom frame assembly; the upper rail of each of the first and second rail sets includes an inwardly-positioned bearing; the at least one roller rotatably attached to the first side bar of the top frame assembly is outwardly-positioned and is movable along the inwardly-positioned bearing of the upper rail of the first rail set of the middle frame assembly and the at least one roller rotatably attached to the second side bar of the top frame assembly is outwardly-positioned and is movable along the inwardly-positioned bearing of the upper rail of the second rail set of the middle frame assembly; the bottom rail of each of the first rail and second rail sets includes an outwardly-positioned bearing; the at least one roller rotatably attached to the first side bar of the bottom frame assembly is inwardly-positioned and is rotatable along the outwardly-positioned bearing of the lower rail of the first rail set of the middle frame assembly and the at least one roller rotatably attached to the second side bar of the bottom frame assembly is inwardly-positioned and is rotatable along the outwardly-positioned bearing of the lower rail of the second rail set of the middle frame assembly; the selective stop mechanism further includes a rod that when moved pivots a bracket that is attached to the stop pin to selectively move the stop pin into and out of any of the one of each of the plurality of periodically spaced holes of the stop arm; a top deck attached to the top frame assembly; the first latch assembly includes a spring attached to the hook to bias the hook toward the downward latching direction; and the second latch assembly includes a spring attached to the hook to bias the hook toward the upward latching direction.

Another illustrative embodiment of the present disclosure provides a bedslide assembly for use on a deck bed of a pickup truck. The bedslide assembly comprises a bottom frame assembly, middle frame assembly, and top frame assembly. The bottom frame assembly includes a first latch bracket and a second latch bracket. The middle frame assembly includes a first latch assembly and a second latch assembly. The first latch assembly includes a hook biased towards a latching direction. The second latch assembly includes a hook biased towards a latching direction. The top frame assembly includes an end plate. The hook of the first latch assembly is selectively engageable with the first latch bracket of the bottom frame assembly. The hook of the second latch assembly is selectively engageable with the end plate of the top frame assembly.

In the above and other embodiments, the tonneau cover may further comprise: the bottom frame assembly further comprises a stop arm extending within the bottom frame assembly wherein the stop arm includes a plurality of periodically spaced holes; the top frame assembly further comprises a selective stop mechanism that includes a stop pin that selectively engages any one of the plurality of periodically spaced holes of the stop arm to limit movement of the top frame assembly; the stop pin that selectively engages the one of each of the plurality of periodically spaced holes of the stop arm limits both movement of the top frame assembly and middle frame assembly with respect to the bottom frame assembly; the middle frame assembly includes a stop member; the top frame assembly includes a stop member; the middle frame assembly includes a full extension stop bracket that is selectively engagable with the stop member of the top frame assembly; the stop member of the middle frame assembly is engagable with the second latch bracket of the bottom frame assembly; the hook of the first latch assembly is disengagable from the first latch bracket of the bottom frame assembly when the first latch assembly is struck by the endplate of the top frame assembly; and the hook of the second latch assembly is disengagable from the endplate of the top frame assembly when the second latch assembly is struck by the second latch bracket of the bottom frame assembly.

Additional features and advantages of the bedslide assembly will become apparent to those skilled in the art upon consideration of the following detailed descriptions of carrying out the bedslide assembly as presently perceived.

BRIEF DESCRIPTION OF DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 1 is a perspective view of a bedslide assembly with the bedslide deck located in its retracted position;

FIG. 2 is a perspective view of the bedslide assembly with the bedslide deck extended from the bottom frame;

Corresponding reference characters indicate corresponding parts throughout the several views. The exemplification set out herein illustrates embodiments of the bedslide assembly, and such exemplification is not to be construed as limiting the scope of the bedslide assembly in any manner.

DETAILED DESCRIPTION OF THE DRAWINGS

Figure 3:
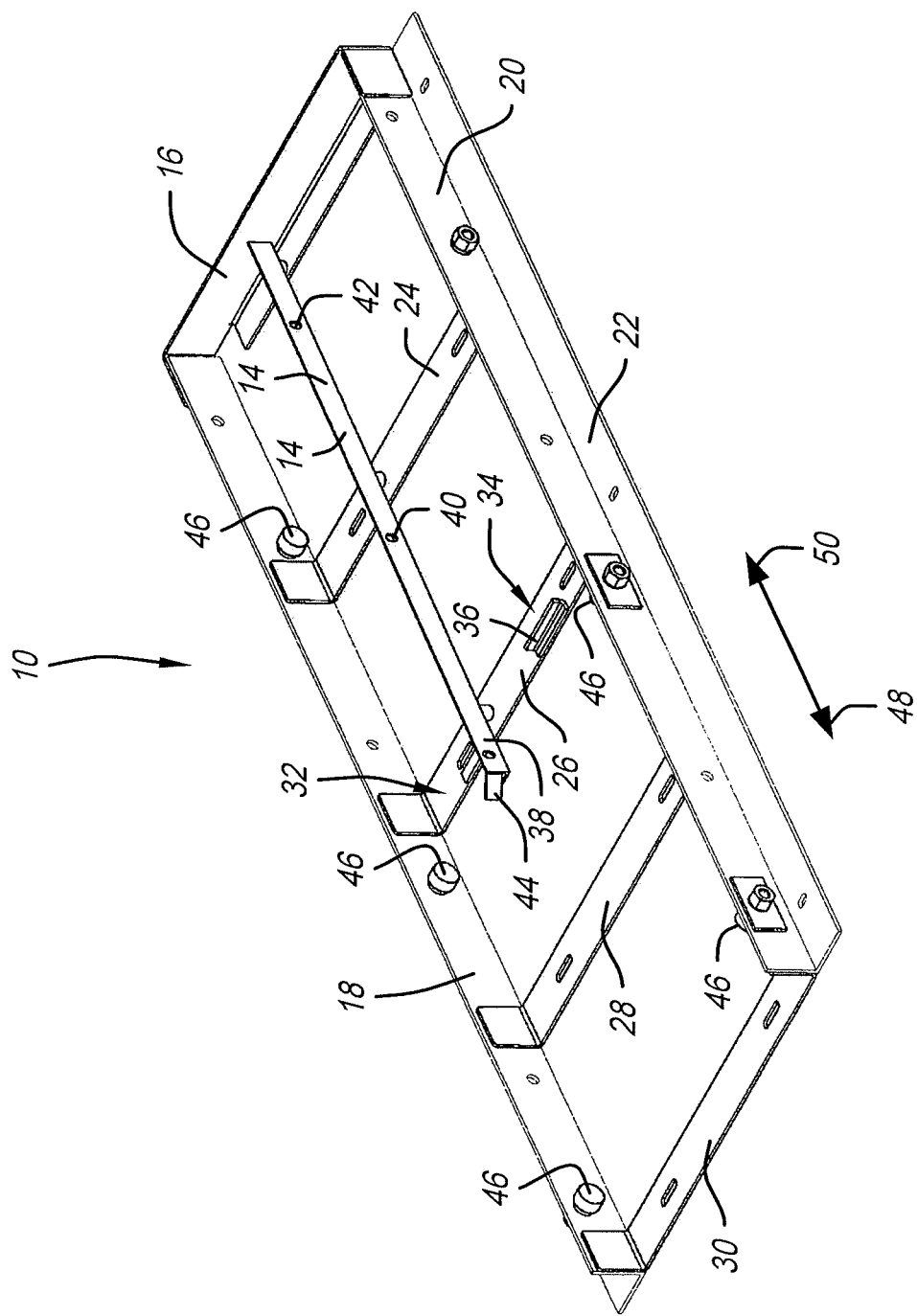
FIG. 3 is a perspective view of a bottom frame assembly.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a bedslide assembly that is attached to the deck floor of the truck bed and is extendable and retractable relative thereto. For example, the bedslide may be slid onto the deck floor and contained within the truck bed. Conversely, the bedslide may be pulled out of the truck bed not unlike a drawer may be pulled out of a cabinet.

As part of the illustrative disclosure herein, the disclosed bedslide assembly includes a middle frame locking latch system that selectively secures the middle frame with respect to the remaining assembly depending on the position of the bedslide and the direction the bedslide is moving.

A perspective view of a bedslide assembly 2 with the bedslide deck 4 located in its retracted position is shown in FIG. 1. Here, bedslide deck 4 is located over the frame members positioned over the deck floor (not shown) of a truck bed as well. A handle 6 is attached to top frame assembly 8. By holding handle 6, bedslide assembly 2 may be pulled into an extended position or pushback to a retracted position in the truck bed.

To that end, a perspective view shown in FIG. 2 depicts the bedslide deck 4 extended from a bottom frame assembly 10 which will be attached to a truck bed deck floor (not shown). As a consequence, the bedslide deck may be extended out from the deck floor of the truck bed. Also shown in this view is middle frame assembly 12 which provides further extension of bedslide deck 4 from the truck bed. In this way, contents to be placed in the truck bed may be placed on bedslide deck 4 that may be either extended out from the truck bed or retracted back into the truck bed for easier access.

A perspective view of bottom frame assembly 10 is shown in FIG. 3. Bottom frame assembly 10 includes a stop arm 14 extending from a backplate 16 and through at least a portion of bottom frame assembly 10. Bounding bottom frame assembly 10 also includes illustrative side panels 18 and 20, with each including a attachment flange 22 for securing to the deck floor of the truck bed. Cross members 24, 26, 28, and 30 are shown spaced apart from each other and extending transverse and attaching to side panels 18 and 20. A latch bracket 32 is located on cross member 26 on one lateral side of stop arm 14 as shown. A flange latch bracket 34 includes an upwardly extending bracket flange 36. In the illustrated embodiment, flange latch bracket 34 is located on a lateral opposing side of cross member 26 from latch bracket 32. As further shown with respect stop arm 14, it includes periodically spaced apart holes 38, 40, and 42 which will be stopping points along the path of travel for the bedslide deck 4. Tab 44 extends from an end of stop arm 14 and assists directing stop pin to slide along stop arm 14. A plurality of rollers 46 are rotatably attached to side panels 18 and 20 as shown to allow middle frame assembly 12 to slide back and forth in directions 48 and 50 relative thereto.

Figure 4:
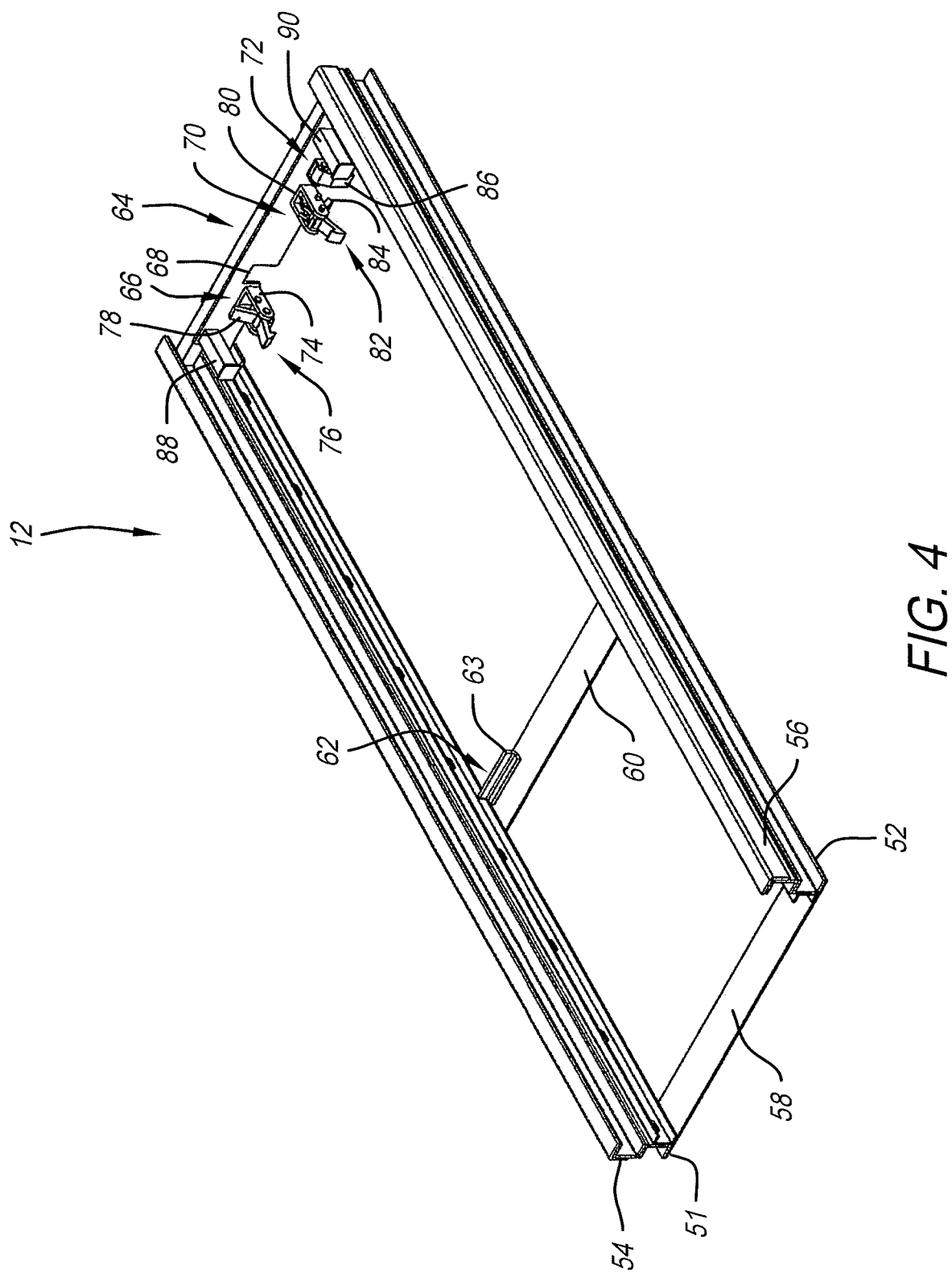
FIG. 4 is a perspective view of a middle frame assembly.

A perspective view of the middle frame assembly 12 is shown in FIG. 4. Middle frame assembly 12 includes longitudinally extending lower rails 51 and 52 and spaced apart longitudinally extending upper rails 54 and 56. As shown, upper rails 54 and 56 are stacked onto lower rails 51 and 52, respectively. Lower rails 51 and 52 are sized to receive rollers 46 located on side panels 18 and 20, respectively, to allow middle frame member 12 to slide with respect to bottom frame assembly 10 in directions 48 and 50 (see, also, FIGS. 7 though 11). Illustratively, the rails are C-shaped bearing members with longitudinally extending lower rails 51 and 52 directed outwardly and longitudinally extending upper rails 54 and 56 directed inwardly. It will be appreciated by the skilled artisan upon reading this disclosure that middle rail assembly 12 is movable with respect to the bottom frame assembly 10 and top frame assembly 8 is movable with respect to middle frame assembly 12.

Cross members 58 and 60 are spaced apart from each other and extend laterally between lower rails 51 and 52 as illustratively shown to keep same spaced apart. A stop bracket 62 that includes an illustrative upward-extending flange 63 is attached to cross member 60. An end cross member 64 also spaced apart from cross members 58 and 60, extend between rails 51 and 52. End cross member 64 includes a latch assembly 66, opening 68, another latch assembly 70, and a safety stop 72. Latch assembly 66 is illustratively fitted in an illustrative U-shaped bracket 74 and includes a downward depending hook 76 pivotably attached to a paddle 78. It is appreciated that downward depending hook 76 and paddle 78 are pivotally biased, and in this illustrative case in a downward direction to a hooking position. Conversely, latch assembly 70 though also contained in a U-shaped bracket 80 includes an upwardly extending hook 82 with a paddle 84 that is spring biased in an upward direction. Stop 72 in an illustrative embodiment includes a pivotably attached stop bar 86 that is configured to provide a stop barrier when middle frame assembly 12 is moved in one direction but not in another. Also, stop pads 88 and 90 are illustratively located on end cross member 64 so that top frame assembly 8 does not damage any of the structures on end cross member 64.

Figure 5:
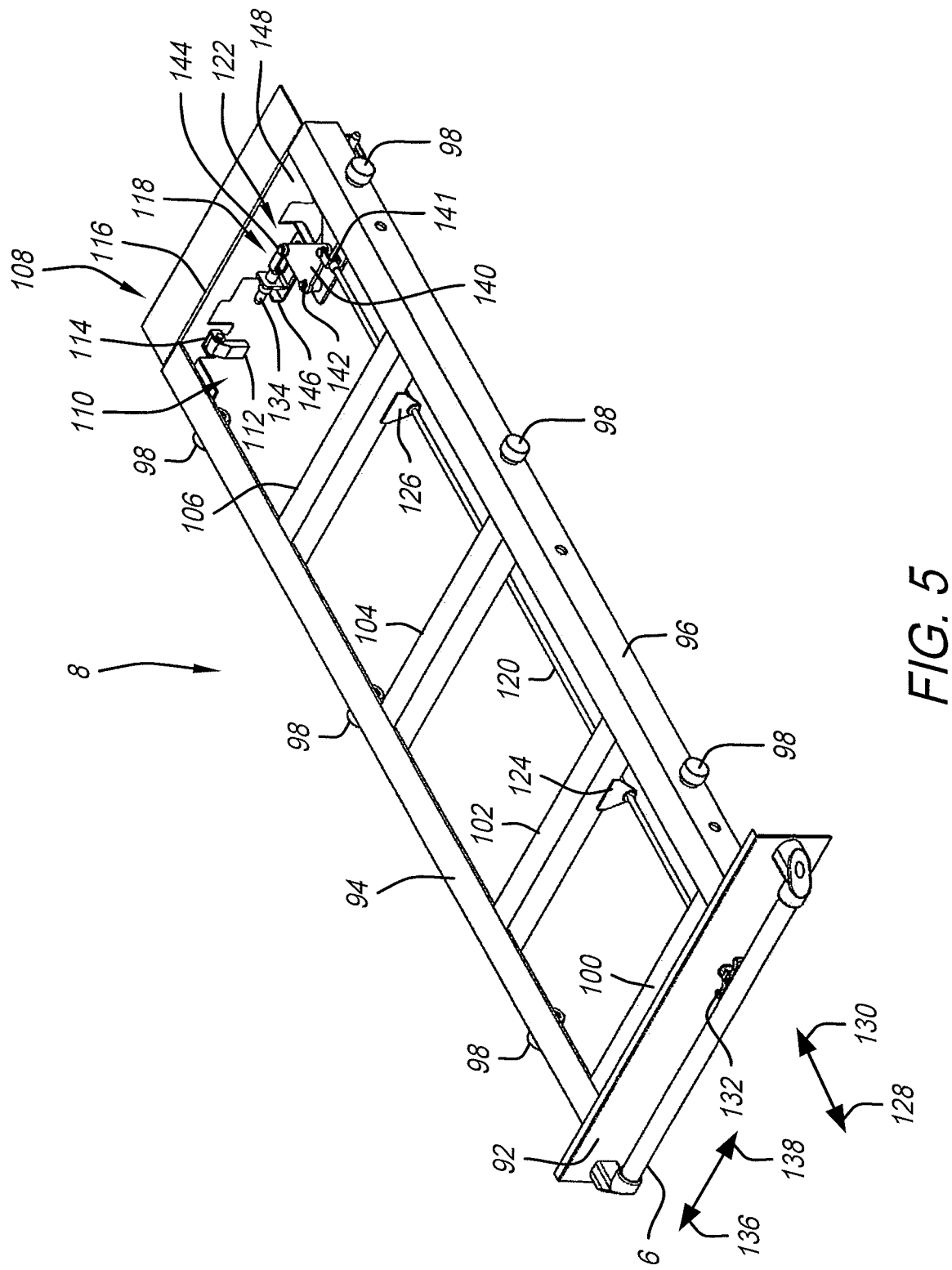
FIG. 5 is a perspective view of a top frame assembly.

A perspective view of top frame assembly 8 is shown in FIG. 5. This top frame assembly 8 includes handle 6 to assist an operator to push or pull the top frame assembly toward or away from the truck bed in directions 50 and 48 (see, also, FIGS. 7 through 11). Illustrative front panel 92 is attached to spaced apart and longitudinally extending side frame members 94 and 96. Handle 6 is illustratively attached to front panel 92. A plurality of rollers 98 are each spaced apart from each other and regularly placed on the exterior of side frame members 94 and 96 as illustratively shown. In this illustrative embodiment, outwardly extending rollers are configured to fit into upper rails 54 and 56 of middle frame assembly 12 so that top frame assembly 8 is movable along and with respect to middle frame assembly 12. Cross members 100, 102, 104, and 106 are spaced apart from each other and each connected to side frame members 94 and 96. An end plate 108 is illustratively located at the end of side frame members 94 and 96 opposite front panel 92. A stop member 110 is attached to endplate 108. Illustratively, stop member 110 includes a stop bar 112 pivotably attached to endplate 108 via bracket 114. In an illustrative embodiment, stop bar 112 is pivotable in one direction but not appreciably in another direction so as to not interfere with movement of top frame assembly 8 in one direction but limit the range of movement in another direction. Endplate 108 also includes pass-through opening 116 to not interfere with latch assembly 66 or stop arm 14.

Also included with the top frame assembly 8 is selected stop assembly 118 which is configured to selectively stop top frame assembly 8 with respect to the other frame assemblies. Illustratively stop assembly 118 may include a longitudinally extending rod 120 that extends from plate 102 to a stop mechanism 122. Brackets 124 and 126 support longitudinally extending rod 120 and allow same to illustratively move in directions 128 and 130. A grip 132 is attached to longitudinally extending rod 120 which is disposed through front panel 92 so that an operator may move rod 182 and either directions 128 and 130. Stop mechanism 122 is illustratively configured to translate movement in directions 128 and 130 into transverse movement of a stop pin 134 in directions 136 and 138. In this illustrative embodiment, longitudinally extending rod 120 is movably attached to a bracket 140 at pivot 141 that is also attached to a pivot pin 142 spaced apart pivot 141. Bracket 140 is pivotally attached to stop pin 134 at pivot pin 144. Stop pin 134 is also disposed through a bracket 146 that is secured to endplate 108. The net effect is that as longitudinally extending rod 120 is pulled in direction 128, bracket 140 is pivoted about pivot pin 142 thereby moving bracket 140 which also moves stop pin 134. Because stop pin 134 is held by bracket 146, movement of stop pin 134 is limited to moving in either directions 130 or 128. In an illustrative embodiment, a spring can bias longitudinally extending rod 120 in direction 130. In other words, unless a force is applied to longitudinally extending rod 120 in direction 128, it will bias toward direction 130. Similarly, a same spring or different spring can act on stop pin 134 and bias it in direction 136. This means that unless a force from bracket 140 is applied to stop pin 134 in direction 138, the spring bias will move stop pin 134 in direction 136. The net result of this is without an opposing force applied to selective stop assembly 118, stop pin 134 will remain extended in direction 136. Lastly, with respect to endplate 108, it includes a latching flange 148 configured to selectively engage upwardly extending hook 82 of latching assembly 70 of middle frame assembly 12.

Figure 6:
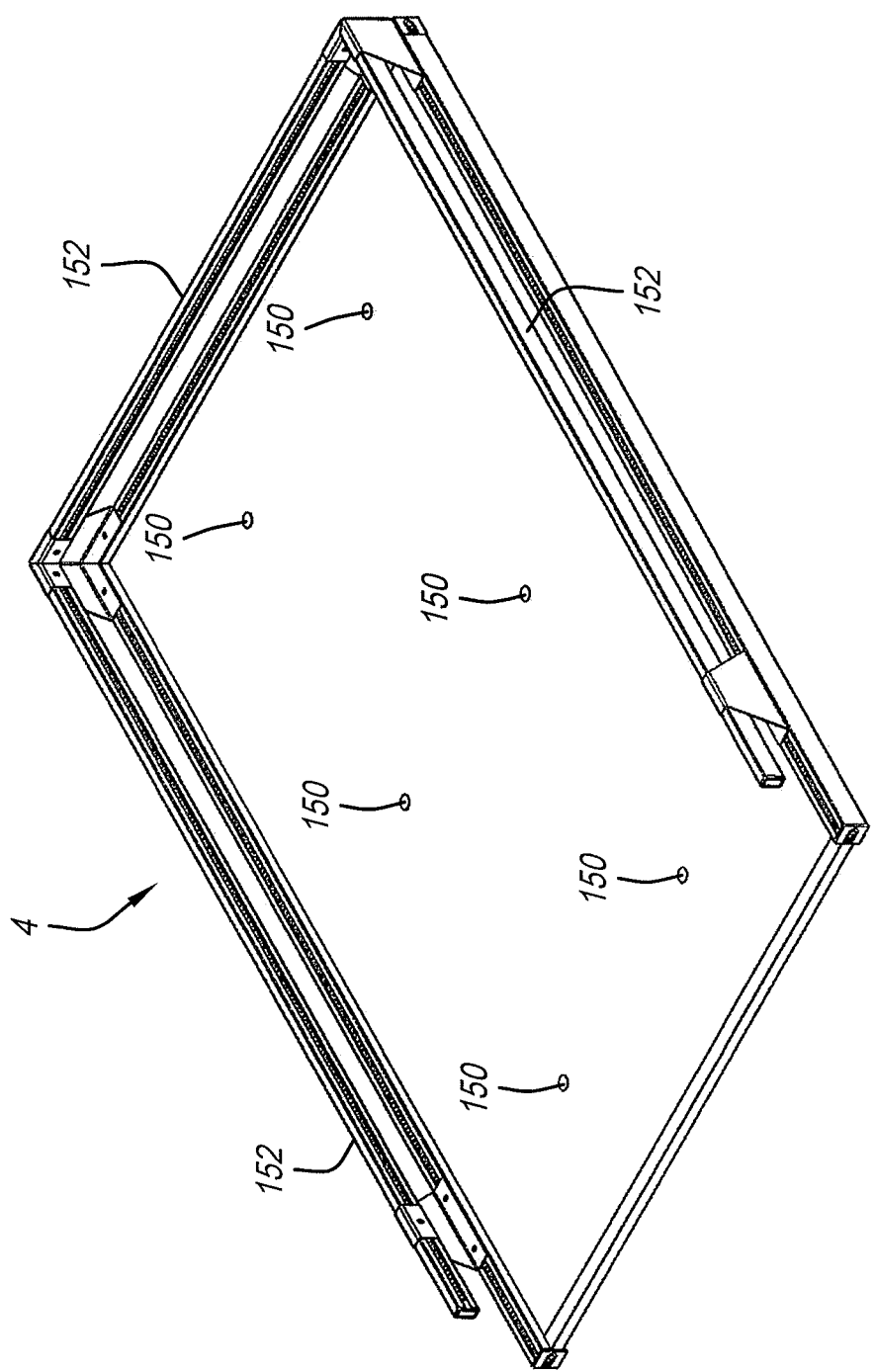
FIG. 6 is a perspective view of a slide deck.

A perspective view of bedslide deck 4 is shown in FIG. 6. It is contemplated that bedslide deck 4 will attach to side frame members 94 and 96 of top frame assembly 8 via fastener holes 150. Accordingly, bedslide deck 4 will move in concert with top frame assembly 8. In this illustrative embodiment, railings 152 are placed about the periphery of top frame assembly 8.

Figure 7:
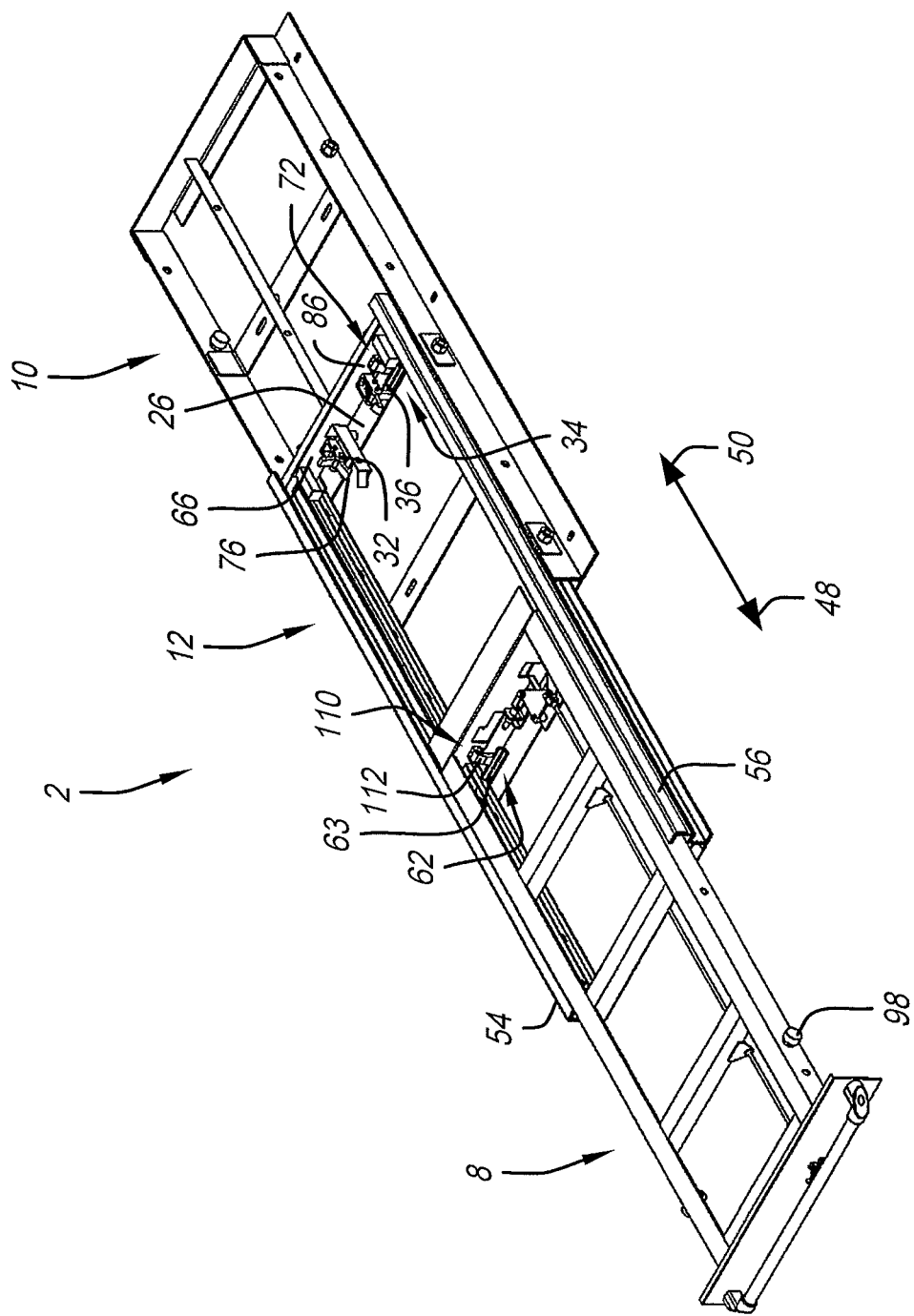
FIG. 7 is a perspective view of the bedslide assembly extended to a full extension.

Perspective views of bedslide assembly 2 positioned between 100% extension and 0% extension are shown in FIGS. 7, 8, 9, 10, and 11. The view in FIG. 7 shows bedslide assembly 2 at full 100% extension (slide deck 4 has been removed for demonstrative purposes). Here, the 100% extension is defined by the limit of movement between the middle frame assembly 12 and top frame assembly 8. In this position, rollers 98 are movable within upper rails 54 and 56 of middle frame assembly 12. The extent to which top frame assembly 8 extends from middle frame assembly 12 is limited by stop bar 112 of stop member 110 engaging upward-extending flange 63 of stop bracket 62. Because of the blocking created by these structures, top frame assembly 8 cannot move any further in direction 48 with respect to middle frame assembly 12. Likewise, stop bar 86 of safety stop 72 engages bracket flange 36 of flange latch bracket 34 on bottom frame assembly 10. This limits the extent to which middle frame assembly 12 can travel in direction 48 toward the extended position with respect to bottom frame assembly 10. In other words, by these structures the full extent to which each of middle frame assembly 12 and top frame assembly 8 can extend from a truck bed deck have been reached.

In addition, downward depending hook 76 of latch assembly 66 attached to end cross member 64 is engaged with latch bracket 32 on cross member 26 of bottom frame assembly 10. With this latching, middle frame assembly 12 is coupled to bottom frame assembly 10. This means that middle frame assembly 12 will not move with respect to bottom frame assembly 10 until an action causes latch assembly 66 to disengage from latch bracket 32.

Figure 8:
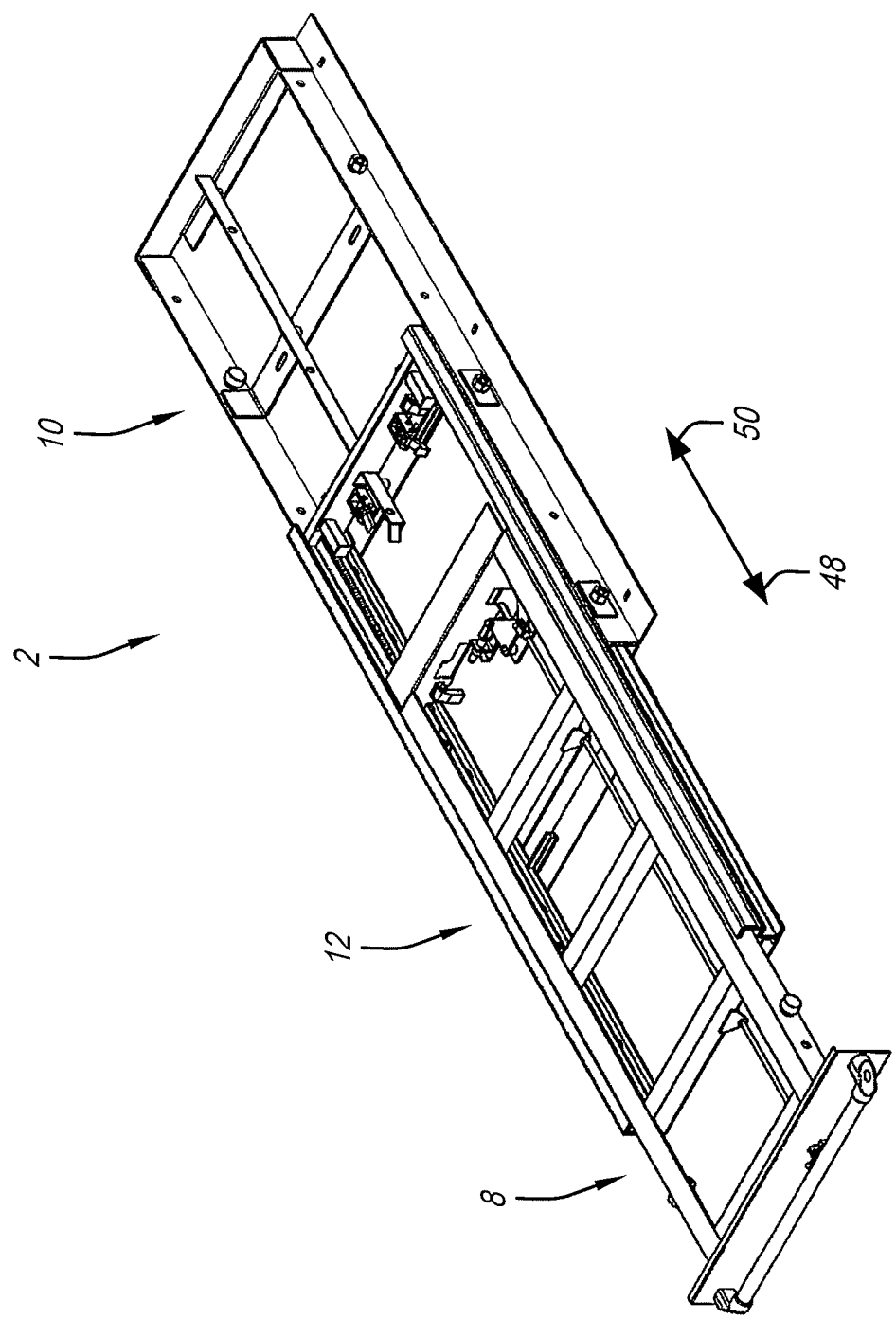
FIG. 8 is a perspective view of the bedslide assembly partially retracted.

Pushing top frame assembly 8 inward as shown in the perspective view of bedslide assembly in FIG. 8 causes bedslide assembly 2 to retract in direction 50 towards bottom frame assembly 10 and the truck bed. In this case, middle frame assembly 12 is latched to bottom frame assembly 10. Those two frames will not move with respect to each other while top frame assembly 8 is moving in direction 50. The net effect is that when moving the bedslide assembly 2 in the push direction (i.e., direction 50), only top frame assembly 8 will be moving at that time. Furthermore, top frame assembly 8 is free to move in either directions 48 or 50 alone with middle frame assembly 12 and bottom frame assembly 10 secured in place.

Figure 9:
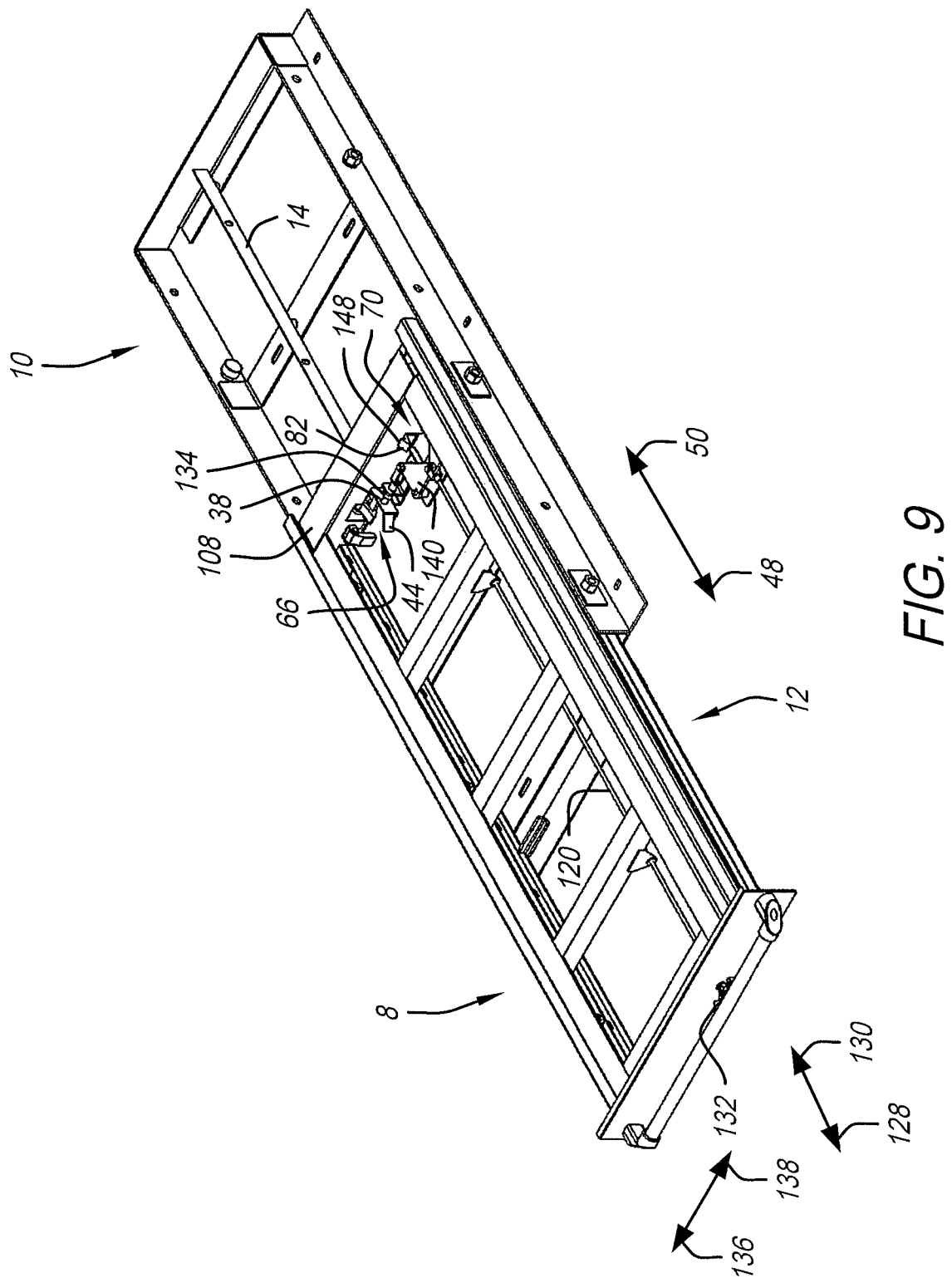
FIG. 9 is another perspective view of the bedslide assembly further recessed from that shown in FIG. 8.

When bedslide assembly 2 is located at the about 50% extension position as shown in FIG. 9, end plate 108 of top frame assembly 8 engages latch assembly 66 of middle frame assembly 12. When this happens, endplate 108 strikes paddle 78 of latch assembly 66 (see, also, FIG. 16) which pushes downward depending hook 76 upwards releasing it from latch bracket 32. In addition, because upwardly extending hook 82 of latch assembly 70 is directed upward, it will engage latching flange 148 on endplate 108. The latching between top frame assembly 8 and middle frame assembly 12 essentially connects them together.

Further, the 50% extension is an illustrative stop position for stop arm 14. As shown, stop pin 134 is extended into hole 38 disposed through stop arm 14. If needed, tab 44 helps direct stop pin 134 to move along stop arm 14. It is appreciated that stop pin 134 is biased in direction 136. As stop pin 134 is moved along stop arm 14 there is enough bias force in direction 138 to push stop pin 134 in direction 138 by stop arm 14 until stop pin 134 reaches hole 38. At this point the force against the directional bias in 136 is relieved thus allowing stop pin 134 to move back with the directional bias 136 and be disposed in hole 38. When this happens, top frame assembly 8 is now held in place with respect to bottom frame assembly 10. Therefore, at this 50% extension position both top frame assembly 8 and middle frame assembly 12 are held together and top frame assembly 8 is held with respect to bottom frame assembly 10. Top frame assembly 8 will not be able to move again until grip 132 pulls longitudinally extending rod 120 in direction 128 again to actuate bracket 140 to move stop pin 134 in direction 138 away from the direction of bias 136 thereby pulling longitudinally extending rod 120 to pivot bracket 140 with sufficient force against bias in direction 136 to be overcome and move stop pin 134 in direction 138 to release stop pin 134 from hole 38 in stop arm 14. Upon this actuation, however, top frame assembly 8 and middle frame assembly 12 are able to further move in concert in either directions 48 and 50.

Figure 10:
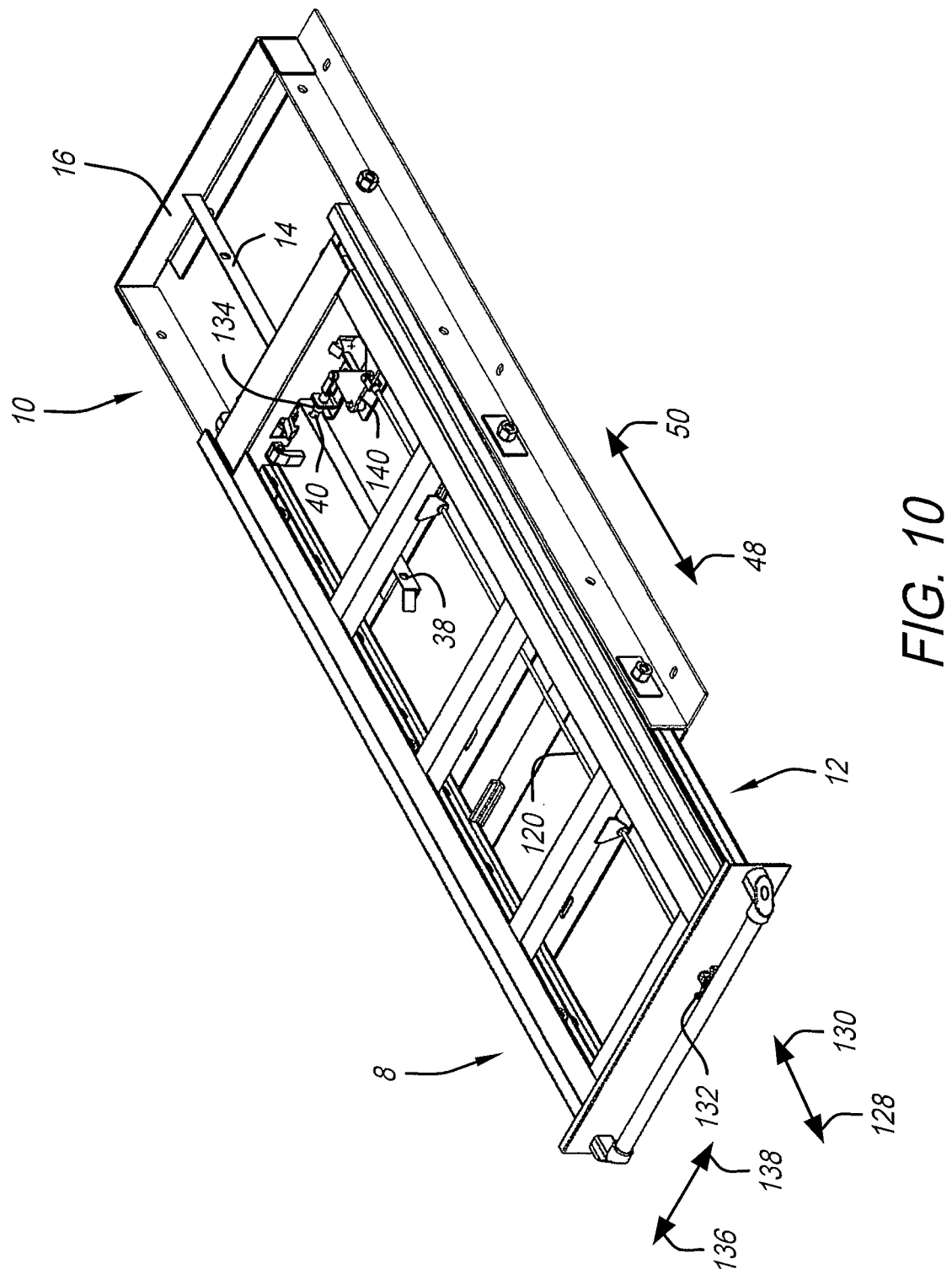
FIG. 10 is another perspective view of the bedslide assembly further retracted than that shown in FIG. 9.

Further travel of top frame assembly 8 and middle frame assembly 12 together in direction 50 toward backplate 16 of bottom frame assembly 10 continues until stop pin 134 engages hole 40 disposed in stop arm 14 of bottom frame assembly 10 as shown in FIG. 10. Both top frame assembly 8 and middle frame assembly 12 were moving together but now with stop pin 134 being held by stop arm 14 both frame assemblies can no longer move with respect to bottom frame assembly 10. This is a predesignated 25% extension. As previously described with respect to hole 38 of stop arm 14, in order to move top frame assembly 8 and middle frame assembly 12 any further, grip 132 needs to pull longitudinally extending rod 120 in direction 128 again to actuate bracket 140 to pivot and pull stop pin 134 in direction 138 away from the direction of bias 136 to remove stop pin 134 from hole 40. When this happens, top frame assembly 8 may continue to move in direction 48 or 50.

Figure 11:
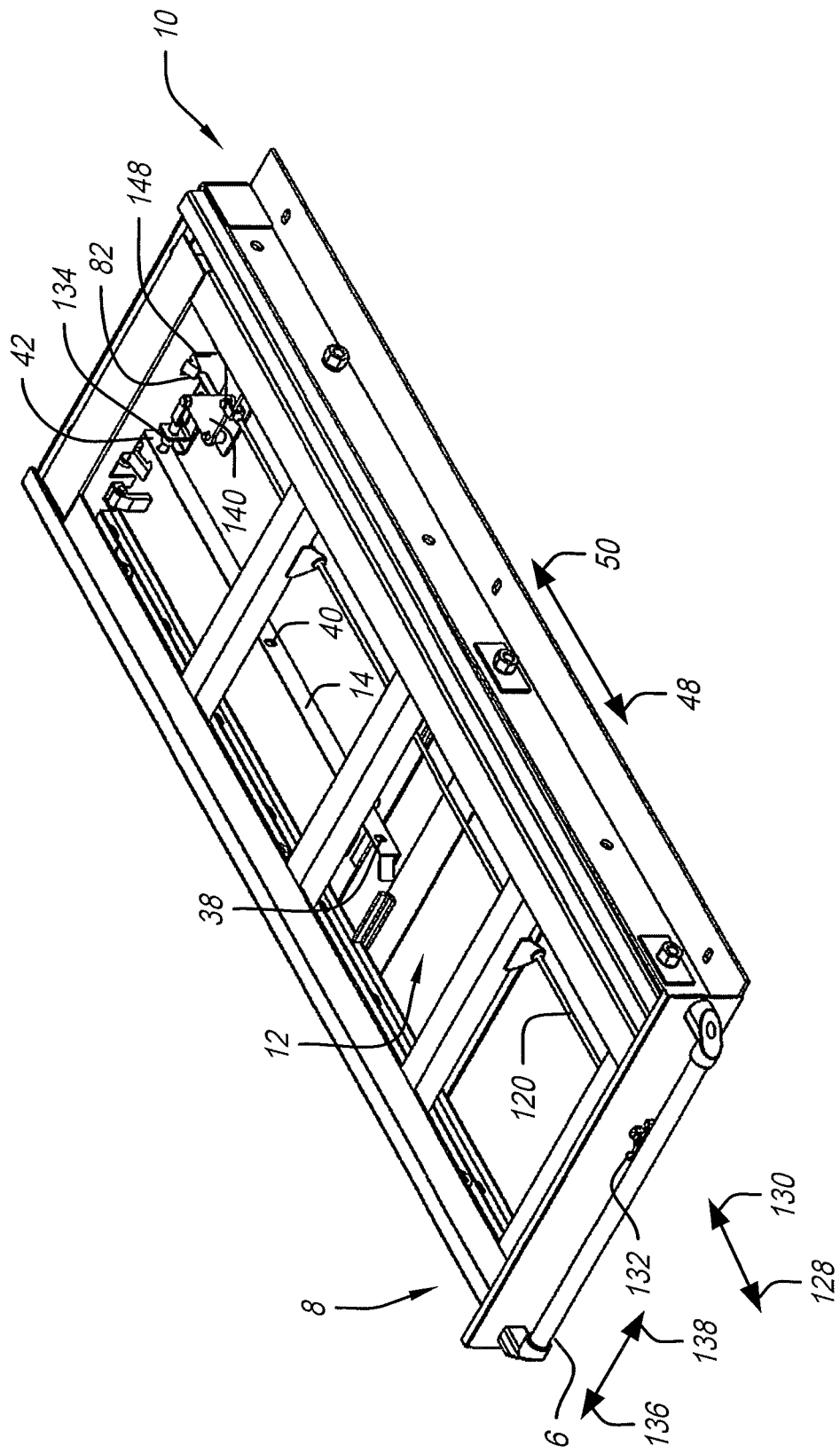
FIG. 11 is another perspective view of the bedslide assembly at full retraction similar to that shown in FIG. 1.

When top and middle frame assemblies 8 and 12, respectively, travel further in direction 50 stop pin 134 eventually engages hole 42 in stop arm 14 to 0% extension as shown in FIG. 11. Here, both top frame assembly 8 and middle frame assembly 12 are fitted in bottom frame assembly 10 representing full retraction. Like described with respect to hole 38 and hole 40 of stop arm 14, stop pin 134 holds all the frame assemblies together until grip 132 pulls longitudinally extending rod 120 in direction 128 to move bracket 140 which holds stop pin 134 in direction 138 against bias direction 136 to remove stop pin 134 from hole 42.

Figure 12:
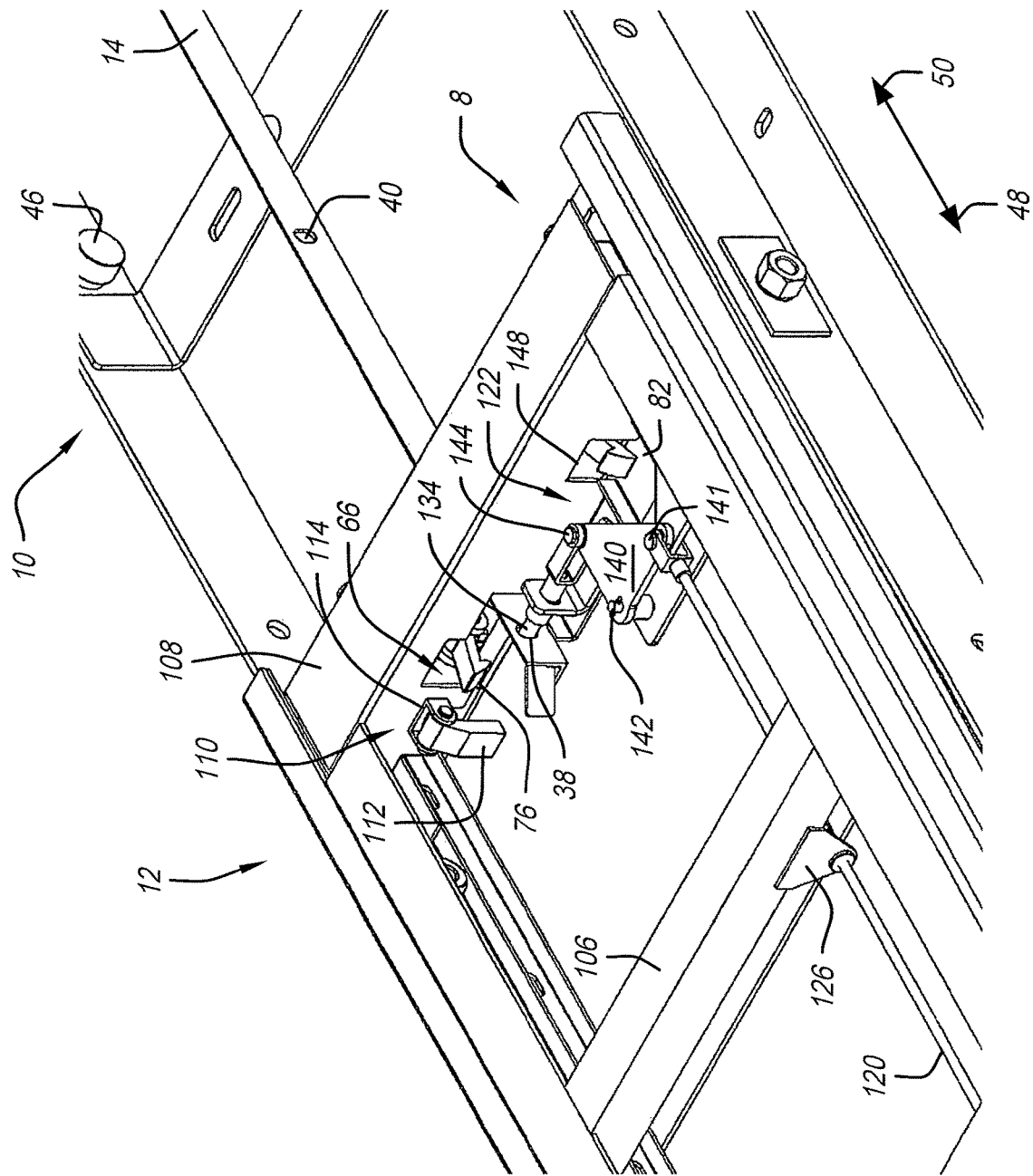
FIG. 12 is a perspective detail view of latching assemblies of the bedslide assembly which is retracted to the extent similarly shown and FIG. 9.
Figure 13:
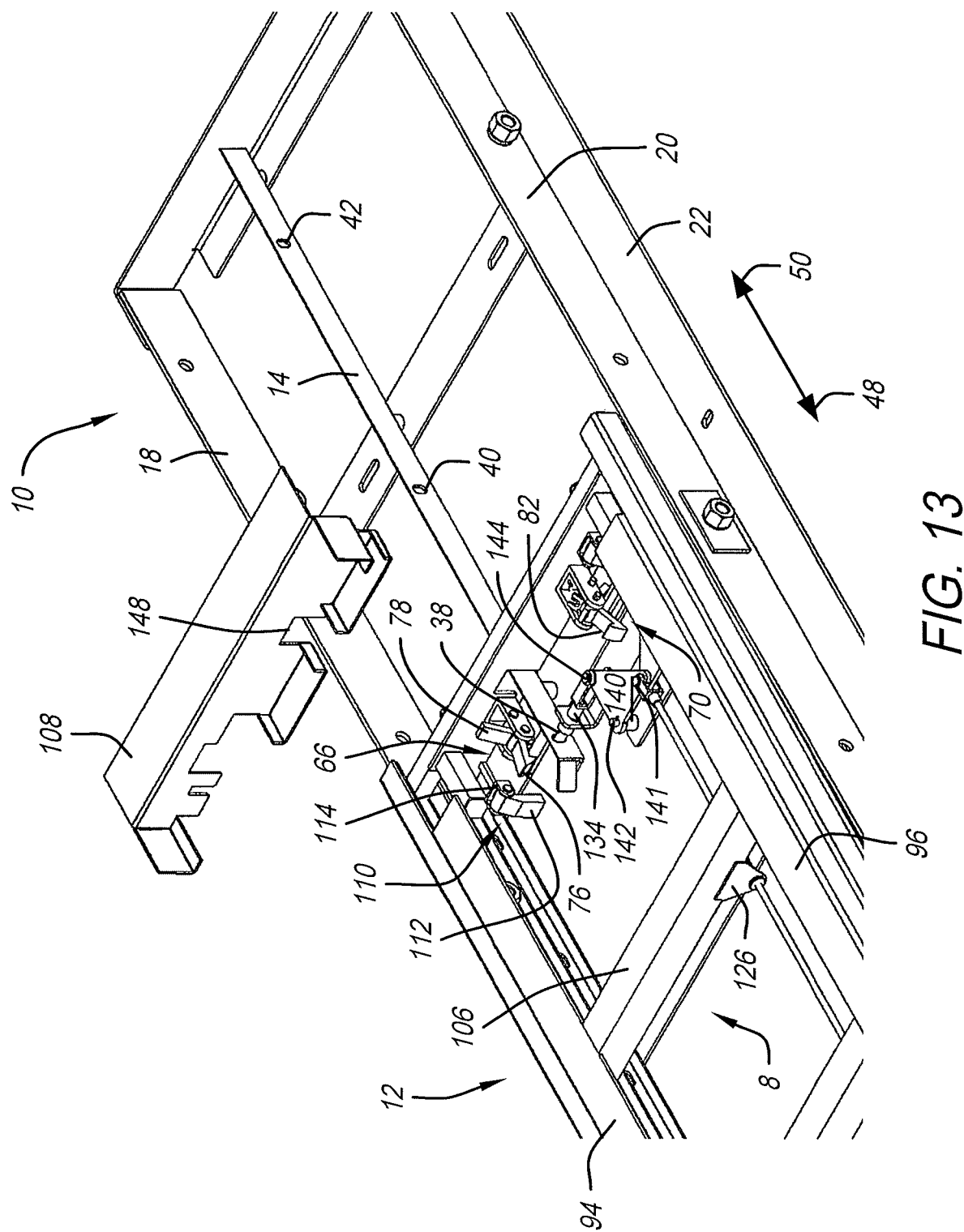
FIG. 13 is a detail perspective view of a portion of bedslide assembly partially exploded with the endplate removed for demonstrative purposes.
Figure 14:
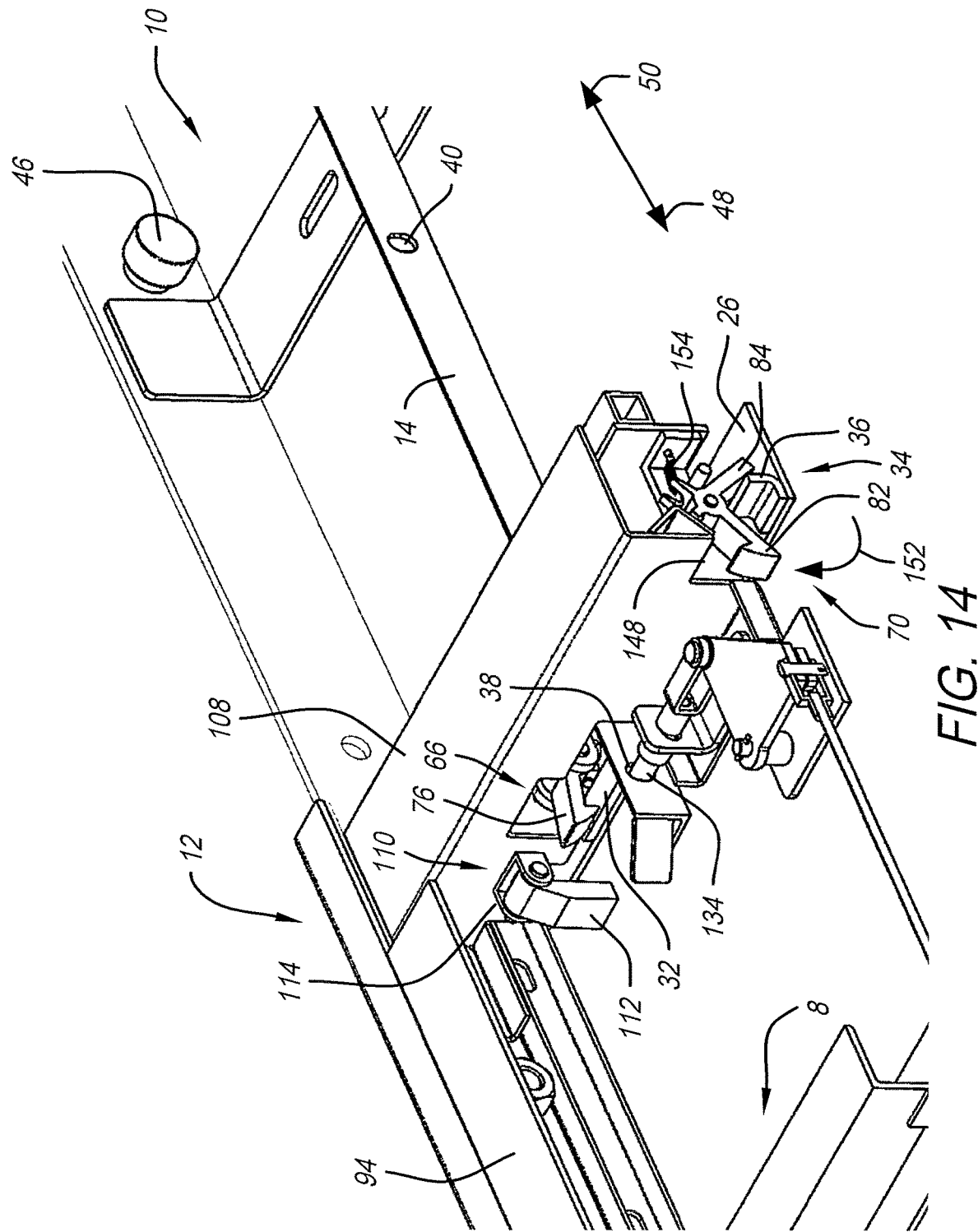
FIG. 14 is a perspective detail partial cutaway view of a portion of the bedslide assembly.

When it is desired to pull bedslide assembly 2 in order to extend same, grip 132 is pulled as previously discussed to remove stop pin 134 from hole 42. When this occurs, top frame assembly 8 is now free to move in direction 48. Because the upwardly extending hook 82 of latch assembly 70 is still engaged with latching flange 148 on endplate 108, top frame assembly 8 will pull middle frame assembly 12 with it in direction 48 to an extended position. This movement of both frame assemblies may continue until stop pin 134 reaches hole 40 at which point both frame assemblies will be stopped with respect to bottom frame assembly 10. By again, pulling grip 132 in direction 128 to release stop pin 134 from hole 40 as previously described, top frame assembly 8 and middle frame assembly 12 are free to move in direction 48 again. This freedom of movement in direction 48 towards an extended position may continue until stop pin 134 engages hole 38 in stop arm 14. At this point both top frame assembly 8 and middle frame assembly 12 are held in place at about 50% extension such as that shown in FIG. 9. At this point however, when stop pin 134 is removed from hole 38 and top frame assembly 8 continues to move position, endplate 108 no longer exerts a force upon downward depending hook 76 of latch assembly 66. This causes hook 76 (because of bias force) to move and engage latch bracket 32 on cross member 26 of bottom frame assembly 10. Bracket flange 36 of flange latch bracket 34 also attached to cross member 26 of bottom frame assembly 10 strikes paddle 84 of latch assembly 70 to pivot upwardly extending hook 82 releasing same from latching flange 148. Additionally, stop bar 86 of safety stop 72 on middle frame assembly 12 will engage bracket flange 36 of flange latch bracket 34 on cross member 26 to prevent middle frame assembly 12 from moving any further in direction 48 from this point. This has the effect of the releasing top frame assembly 8 from middle frame assembly 12 while holding middle frame assembly 12 onto bottom frame assembly 10. At this point, top frame assembly 8 is able to continue moving in direction 48 toward positions such as that shown in FIG. 8 without middle frame assembly moving any further in direction 48. Top frame assembly 8 may continue moving in direction 48 until stop bar 112 engages upward extending flange 63 of stop bracket 62 on middle frame assembly 12. At this point top frame assembly 8 will be that 100% extension as shown in FIG. 7. It is further appreciated that by continually pulling longitudinally extending rod 120 in direction 128 bracket 140 holds stop pin 134 in direction 138 against bias direction 136 in order to hold stop pin 134 from any of holes 38, 40, and 42. This allows bedslide assembly 2 to move in either directions 48 or 50 freely through its permissible range of motion Perspective detail views of the endplate 108 and latch assemblies 66 and 70 of bedslide assembly 2 located at about the 50% extension position are shown in FIGS. 12, 13, and 14. The difference between the FIGS. 12 and 13 is that endplate 108 is shown installed on top frame assembly 8 in FIG. 12, where it is removed for demonstrative purposes in FIG. 13. The detail view in FIG. 14 is a partial cutaway view to show how both endplate 108 of top frame assembly 8 and latch assembly 70 interact with flange latch bracket 34 on cross member 26 of bottom frame assembly 10.

At the 50% extension shown in FIGS. 12 and 13, stop pin 134 of stop mechanism 122 is engaged with hole 38 in stop arm 14 (see, also, FIG. 9). At this stage, upwardly extending hook 82 is not yet engaged with latching flange 148 on endplate 108. Latch assembly 66 has been engaged by endplate 108 by striking paddle 78 detaching middle frame assembly 12 from bottom frame assembly 10 when stop pin 134 is released from stop arm 14. Top frame assembly 8 is movable in the push direction 50 so latching flange 148 of endplate 108 will engage upwardly extending hook 82 of latch assembly 70 (see, also, FIG. 14), pivoting upwardly extending hook 82 in direction 152 toward latching flange 148 of endplate 108 and gripping to same. Thus, it's between the 50% and 25% extension, that when pushing top frame assembly 8, middle frame assembly 12 is not only released from bottom frame assembly 10, but is then latched onto top frame assembly 8. This is how both top frame assembly 8 and middle frame assembly 12 move together between 0% and 50% extension (whether pushing or pulling).

Additionally, because endplate 108 on top frame assembly 8 releases downward depending hook 76 of latch assembly 66, middle frame assembly 12 is free from bottom frame assembly 10 and is movable with top frame assembly 8 between the 50% and 0% extension. It is noted that when middle and top frame assemblies 12 and 8 move in the pull direction 48 (see, e.g., FIG. 14), when latch assembly 66 contacts latch bracket 32 bottom frame assembly 10 and middle frame assembly 12 are held together.

Further, at about the same time (or just before), flange latch bracket 34 will engage latch assembly 70 releasing its upwardly extending hook 82 from latching flange 148 of endplate 108 so that subsequent movement of top frame assembly 8 in the pull direction 48 releases middle frame assembly. Top frame assembly 8 is now moving alone without middle frame assembly 12 moving with it. Again, this is because middle frame assembly 12 is held by bottom frame assembly 10 by virtue of latch assembly 66 engaging latch bracket 32. As such, when moving bedslide assembly 2 in the pull direction 48 extending from the truck bed, only top frame assembly 8 (with bedslide deck 4 attached thereto) is being moved within that range. Middle frame assembly 12 remains stationary through that range of movement. It is notable that upwardly extending hook 82 and paddle 84 are attached to spring 154 to bias upwardly extending hook 82 to flange 148.

Also shown in this view is stop member 110 that includes stop bar 112 pivotably attached to U-shape bracket 114 located on endplate 108 of top frame assembly 8. Stop bar 112 is pivotable with respect to endplate 108 so that as top frame assembly 8 moves in direction 50 stop bar 112 can pivot out of the way and not serve as an obstruction. Conversely, however, when top frame assembly 8 moves in direction 48, any obstructions such as upward extending flange 63 of stop bracket 62 (see, also, FIG. 7) limit top frame assembly 8 in its movement in that direction.

Figure 15:
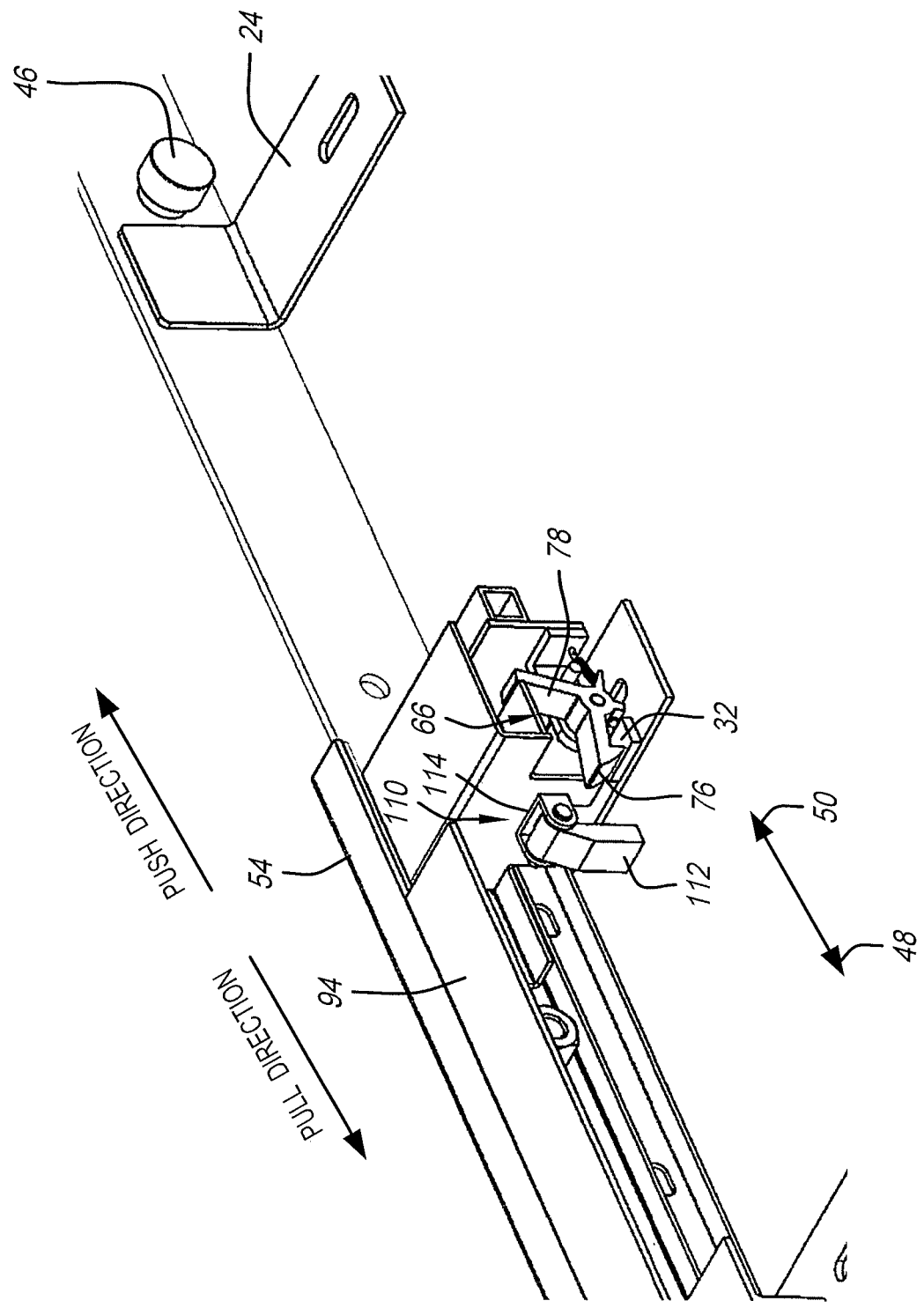
FIG. 15 is another detail cutaway view of a portion of the bedslide assembly.
Figure 16:
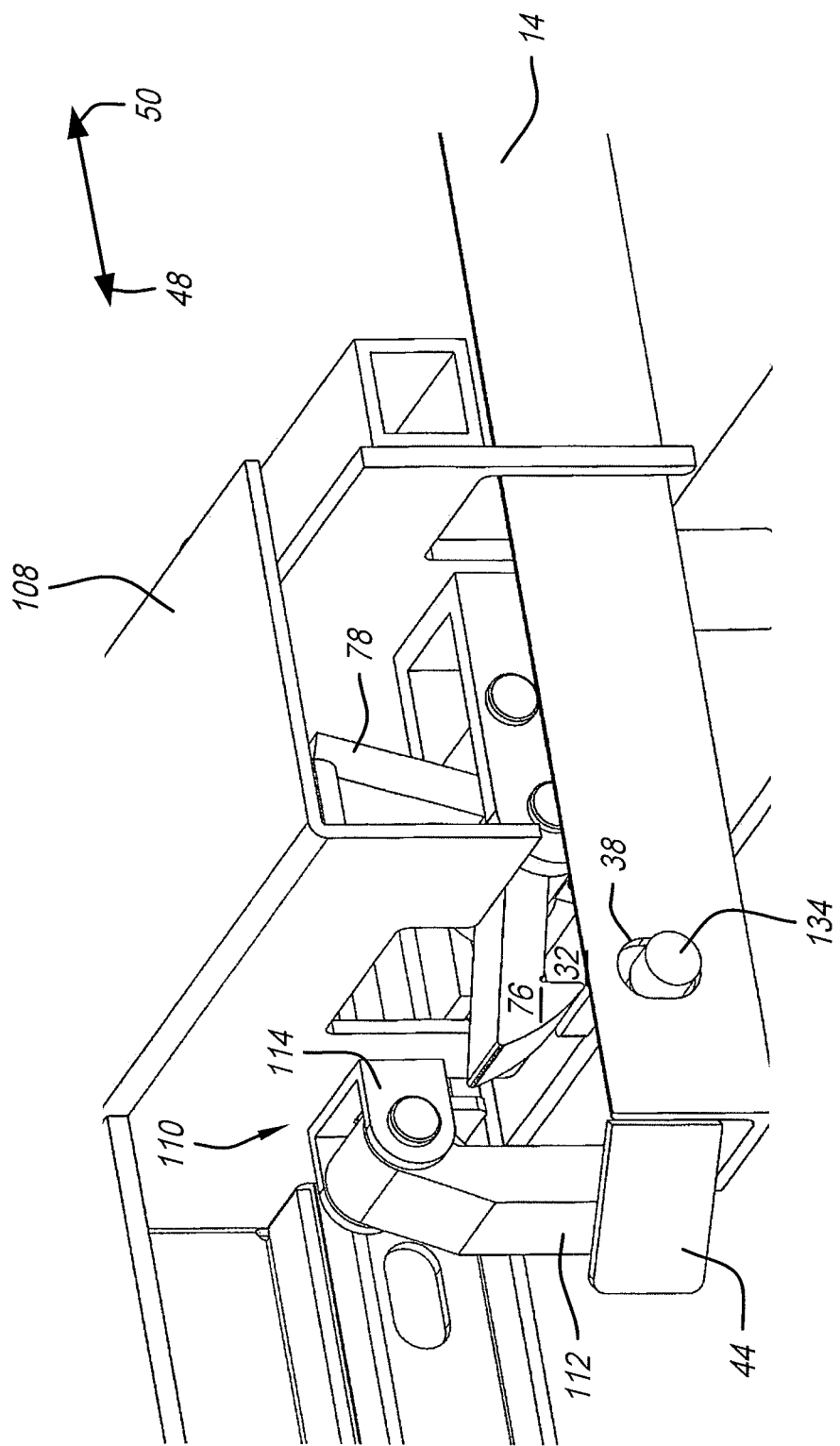
FIG. 16 is another detail partially cutaway view of a portion of the bedslide assembly.

Detail cutaway perspective view of latch assembly 66 and latch bracket 32 on middle and bottom frame assemblies 12 and 10, respectively, are shown in FIGS. 15 and 16. It is appreciated from these views that, when the top frame assembly 8 is moved in the pull direction 48, endplate 108 does not engage latch assembly 66. Instead, latch assembly 66 is spring-loaded or biased so that, as middle frame assembly 12 is moved in pull direction 48, downward depending hook 76 will pass over latch bracket 32, and then bias engagement thereto secures latch assembly 66 to latch bracket 32. The result is that middle frame assembly 12 is now coupled to bottom frame assembly 10 keeping both stationary with respect to each other.

On the return push direction 50, as previously discussed, endplate 108 strikes paddle 78 of latch assembly 66 lifting downward depending hook 76 from latch bracket 32. This allows middle frame assembly 12 to be movable with respect to the bottom frame assembly 10. And again, it is appreciated that by virtue of the coupling between latch assembly 70 and latching flange 148 of endplate 108 of top frame assembly 8, top and middle frame assemblies 8 and 12 will move together in push direction 50. Indeed, top and middle frame assemblies 8 and 12 will move together in both the push and pull directions 50 and 48 between 0% and 50% extension. Other structures shown in this view include stop member 110 with stop bar 112 pivoting with respect to U-bracket 114. Also stop arm 14 is shown including tab 44 and stop pin 134 illustratively disposed in hole 38.

In the drawings, some structural or method features may be shown in specific arrangements and/or orderings. It should be appreciated, however, that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A bedslide assembly for use on a deck bed of a pickup truck, the bedslide assembly comprising:
    a bottom frame assembly configured to be attached to the deck bed;
    wherein the bottom frame assembly includes spaced apart opposing first and second side bars, at least one roller rotatably attached to each of the first and second side bars, at least one cross member extending transverse the first and second side bars, wherein the at least one cross member includes a first latch bracket and second latch bracket attached thereon, and a stop arm extending transverse to the at least one cross member, wherein the stop arm includes a plurality of periodically spaced holes;
    a middle frame assembly that includes opposing spaced apart first and second rail sets, each of the first and second rail sets includes an upper rail and a lower rail, at least one cross member with a full extension stop bracket attached thereon, the middle frame assembly further incudes a first latch assembly, a second latch assembly, and a stop member;
    wherein the first latch assembly includes a hook biased toward a downward latching direction with respect to the truck bed, wherein the biased hook includes a paddle both of which are pivotable;
    wherein the second latch assembly includes a second hook biased toward an upward latching direction with respect to the truck bed, wherein the biased second hook includes a paddle both of which are pivotable;
    wherein the stop member is at least partially pivotable with respect to the middle frame assembly;
    a top frame assembly that includes spaced apart opposing first and second side bars, at least one roller rotatably attached to the first side bar and at least one roller rotatably attached to the second side bar, at least one cross member extending transverse the first and second side bars, an end plate also extending transverse the first and second side bars, a stop member, and a selective stop mechanism;
    wherein the stop member of the top frame assembly is at least partially pivotable with respect to the top frame assembly;
    wherein the selective stop mechanism includes a stop pin that extends transverse with respect to the spaced apart opposing first and second side bars of the top frame assembly;
    wherein the at least one roller rotatably attached to the first side bar of the top frame assembly engages and is movable along the upper rail of the first rail set of the middle frame assembly and the at least one roller rotatably attached to the second side bar of the top frame assembly engages and is movable along the upper rail of the second rail set of the middle frame assembly;
    wherein the at least one roller rotatably attached to the first side bar of the bottom frame assembly engages and is rotatable along the lower rail of the first rail set of the middle frame assembly and the at least one roller rotatably attached to the second side bar of the bottom frame assembly engages and is rotatable along the lower rail of the second rail set of the middle frame assembly;
    wherein the stop pin of the selective stop mechanism is selectively engageable with any one of each of the plurality of periodically spaced holes of the stop arm to limit movement of the top frame assembly and middle frame assembly with respect to the bottom frame assembly at the any one of each of the plurality of periodically spaced holes;
    wherein the hook of the first latch assembly is selectively engageable with the first latch bracket on the cross member of the bottom frame assembly, and when the paddle of the first latch assembly is struck by the end plate of the top frame assembly, the hook of the first latch assembly is releasable from the second latch bracket on the cross member of the bottom frame assembly; and
    wherein the hook of the second latch assembly is selectively engageable with the end plate of the top frame assembly, and when the paddle of the second latch assembly is struck by the second latch bracket of the bottom frame assembly, the hook of the second latch assembly is releasable from the end plate of the top frame assembly.

2. The bedslide assembly of claim 1, wherein the stop member of the top frame assembly is engageable with the full extension stop bracket of the middle frame assembly to limit extension of the top frame assembly with respect to the middle frame assembly.

3. The bedslide assembly of claim 1, wherein the stop member of the middle frame assembly is engageable with the second latch bracket of the bottom frame assembly to limit extension of the middle frame assembly with respect to the bottom frame assembly.

4. The bedslide assembly of claim 1, wherein the upper rail of each of the first and second rail sets includes an inwardly-positioned bearing.

5. The bedslide assembly of claim 4, wherein the at least one roller rotatably attached to the first side bar of the top frame assembly is outwardly-positioned and is movable along the inwardly-positioned bearing of the upper rail of the first rail set of the middle frame assembly and the at least one roller rotatably attached to the second side bar of the top frame assembly is outwardly-positioned and is movable along the inwardly-positioned bearing of the upper rail of the second rail set of the middle frame assembly.

6. The bedslide assembly of claim 1, wherein the lower rail of each of the first rail and second rail sets includes an outwardly-positioned bearing.

7. The bedslide assembly of claim 6, wherein the at least one roller rotatably attached to the first side bar of the bottom frame assembly is inwardly-positioned and is rotatable along the outwardly-positioned bearing of the lower rail of the first rail set of the middle frame assembly and the at least one roller rotatably attached to the second side bar of the bottom frame assembly is inwardly-positioned and is rotatable along the outwardly-positioned bearing of the lower rail of the second rail set of the middle frame assembly.

8. The bedslide assembly of claim 1, wherein the selective stop mechanism further includes a rod that when moved pivots a bracket that is attached to the stop pin to selectively move the stop pin into and out of the any one of each of the plurality of periodically spaced holes of the stop arm.

9. The bedslide assembly of claim 1, further comprising a top deck attached to the top frame assembly.

10. The bedslide assembly of claim 1, wherein the first latch assembly includes a spring attached to the hook to bias the hook toward the downward latching direction.

11. The bedslide assembly of claim 1, wherein the second latch assembly includes a spring attached to the hook to bias the hook toward the upward latching direction.

12. A bedslide assembly for use on a deck bed of a pickup truck, the bedslide assembly comprising:
a bottom frame assembly configured to be attached to the deck bed;
wherein the bottom frame assembly includes a first latch bracket and a second latch bracket;
a middle frame assembly that includes a first latch assembly and a second latch assembly;
wherein the first latch assembly includes a hook;
wherein the second latch assembly includes a hook; and
a top frame assembly that includes an end plate;
wherein the hook of the first latch assembly is selectively engageable with the first latch bracket of the bottom frame assembly; and
wherein the hook of the second latch assembly is selectively engageable with the end plate of the top frame assembly.

13. The bedslide assembly of claim 12, wherein the bottom frame assembly further comprises a stop arm extending within the bottom frame assembly, wherein the stop arm includes a plurality of periodically spaced holes.

14. The bedslide assembly of claim 13, wherein the top frame assembly further comprises a selective stop mechanism that includes a stop pin that is selectively engageable into any one of each of the plurality of periodically spaced holes of the stop arm to limit movement of the top frame assembly.

15. The bedslide assembly of claim 14, wherein the stop pin that selectively engages the any one of each of the plurality of periodically spaced holes of the stop arm limits both movement of the top frame assembly and the middle frame assembly with respect to the bottom frame assembly.

16. The bedslide assembly of claim 12, wherein the middle frame assembly includes a stop member.

17. The bedslide assembly of claim 16, wherein the top frame assembly includes a stop member.

18. The bedslide assembly of claim 17, wherein the middle frame assembly includes a full extension stop bracket that is engagable with the stop member of the top frame assembly, and wherein the stop member of the middle frame assembly is engagable with the second latch bracket of the bottom frame assembly.

19. The bedslide assembly of claim 12, wherein the hook of the first latch assembly is disengagable from the first latch bracket of the bottom frame assembly when the first latch assembly is struck by the endplate of the top frame assembly.

20. The bedslide assembly of claim 12, wherein the hook of the second latch assembly is disengagable from the endplate of the top frame assembly when the second latch assembly is struck by the second latch bracket of the bottom frame assembly.

* * * * *